United States Patent
Levi et al.

(10) Patent No.: US 8,724,890 B2
(45) Date of Patent: May 13, 2014

(54) VISION-BASED OBJECT DETECTION BY PART-BASED FEATURE SYNTHESIS

(75) Inventors: Dan Levi, Kyriat Ono (IL); Aharon Bar Hillel, Keiryat-Ono (IL)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 13/080,717

(22) Filed: Apr. 6, 2011

(65) Prior Publication Data

US 2012/0257819 A1 Oct. 11, 2012

(51) Int. Cl.
*G06K 9/62* (2006.01)

(52) U.S. Cl.
USPC .......... 382/159; 382/103; 382/224; 382/106; 382/107; 382/155; 382/162; 382/168; 382/173; 382/181; 382/190; 382/209; 382/305

(58) Field of Classification Search
CPC . G06K 9/00288; G06K 9/46; G06K 9/00221; G06K 9/00536; G06K 9/2054
USPC ......... 382/159, 103, 224, 106, 107, 155, 162, 382/168, 173, 181, 190, 209, 305
See application file for complete search history.

(56) References Cited

U.S. PATENT DOCUMENTS

2009/0141940 A1* 6/2009 Zhao et al. ............ 382/103
2009/0244291 A1* 10/2009 Saptharishi et al. ....... 348/187

* cited by examiner

*Primary Examiner* — Mike Rahmjoo

(57) ABSTRACT

A method is provided for training and using an object classifier to identify a class object from a captured image. A plurality of still images is obtained from training data and a feature generation technique is applied to the plurality of still images for identifying candidate features from each respective image. A subset of features is selected from the candidate features using a similarity comparison technique. Identifying candidate features and selecting a subset of features is iteratively repeated a predetermined number of times for generating a trained object classifier. An image is captured from an image capture device. Features are classified in the captured image using the trained object classifier. A determination is made whether the image contains a class object based on the trained object classifier associating an identified feature in the image with the class object.

19 Claims, 4 Drawing Sheets

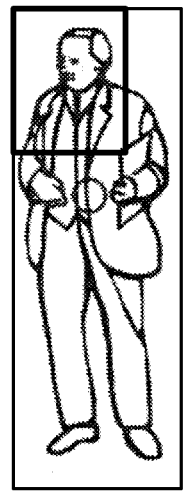
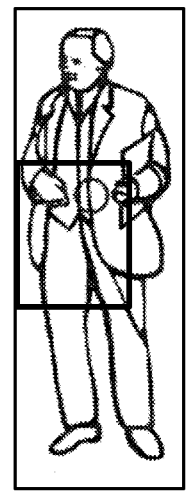
Fig. 2a                Fig. 2b
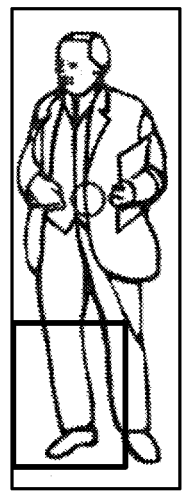
Fig. 2c

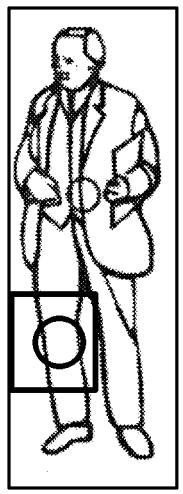
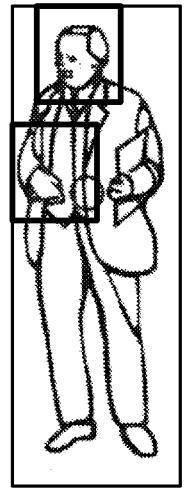
Fig. 3    Fig. 4    Fig. 6
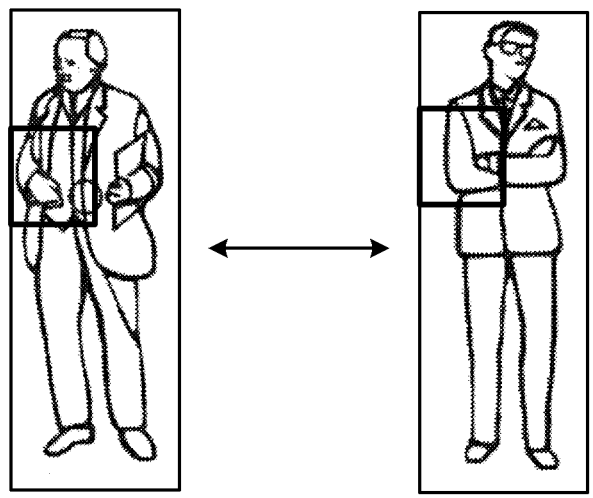
Fig. 5

VISION-BASED OBJECT DETECTION BY PART-BASED FEATURE SYNTHESIS

BACKGROUND OF INVENTION

An embodiment relates generally to object detection systems.

Human detection is an important operation of the object detection applications that may be used with automotive safety, smart surveillance systems, and factory work environments. From a scientific point of view, human detection incorporates most of the difficulties characterizing object detection in general, namely viewpoint, scale and articulation problems. Several approaches have been put forward that utilize machine learning to train a computer to recognize a class of objects. Many methods are part-based methods that decompose the object into parts; however, such techniques are deficient with respect to performance (e.g., occlusion, pose variation) and scalability (e.g., number of parts, model complexity). It is widely acknowledged that a method's detection performance largely depends on the richness and quality of the features used, and the ability to combine diverse feature families. As a result, deficiencies such as performance and scalability continue to be issues with known techniques.

SUMMARY OF INVENTION

An advantage of an embodiment is a learned classifier that is able to accommodate a large number of parts and model complexity through a feature synthesis technique. The feature synthesis technique involves iteratively applying a feature generation process and feature selection process. The process begins with sample images in the initial iteration stage, and after the first iteration stage, features selected from a previous iteration are used as feature inputs to the next iteration. Each iteration may extract various features in the form of different poses, occlusions, or may be combined with other features to identify more complex parts of the object.

An embodiment contemplates a method of for training and using an object classifier to identify a class object from a captured image. The method includes (a) a plurality of still images is obtained from training data; (b) a feature generation technique is applied to the plurality of still images of the training data for identifying candidate features from each respective image; (c) a subset of features are selected from the candidate features using a similarity comparison technique; (d) steps (a) through (c) are iteratively repeated a predetermined number of times as a function of the selected subset of features identified in step (c); (e) a trained object classifier is generated; (f) an image is captured from an image capture device; (g) features are classified in the captured image using the trained object classifier; and (h) a determination is made whether the image contains a class object based on the trained object classifier associating an identified feature in the image with the class object.

BRIEF DESCRIPTION OF DRAWINGS

FIGS. 2a-2c illustrate exemplary scanning of an image.

FIG. 3 illustrates an example of a localized feature.

FIG. 4 illustrates an example of a subpart feature.

FIG. 5 illustrates an example of a logical "OR" feature.

FIG. 6 illustrates an example of a logical "AND" feature.

DETAILED DESCRIPTION

Figure 1:
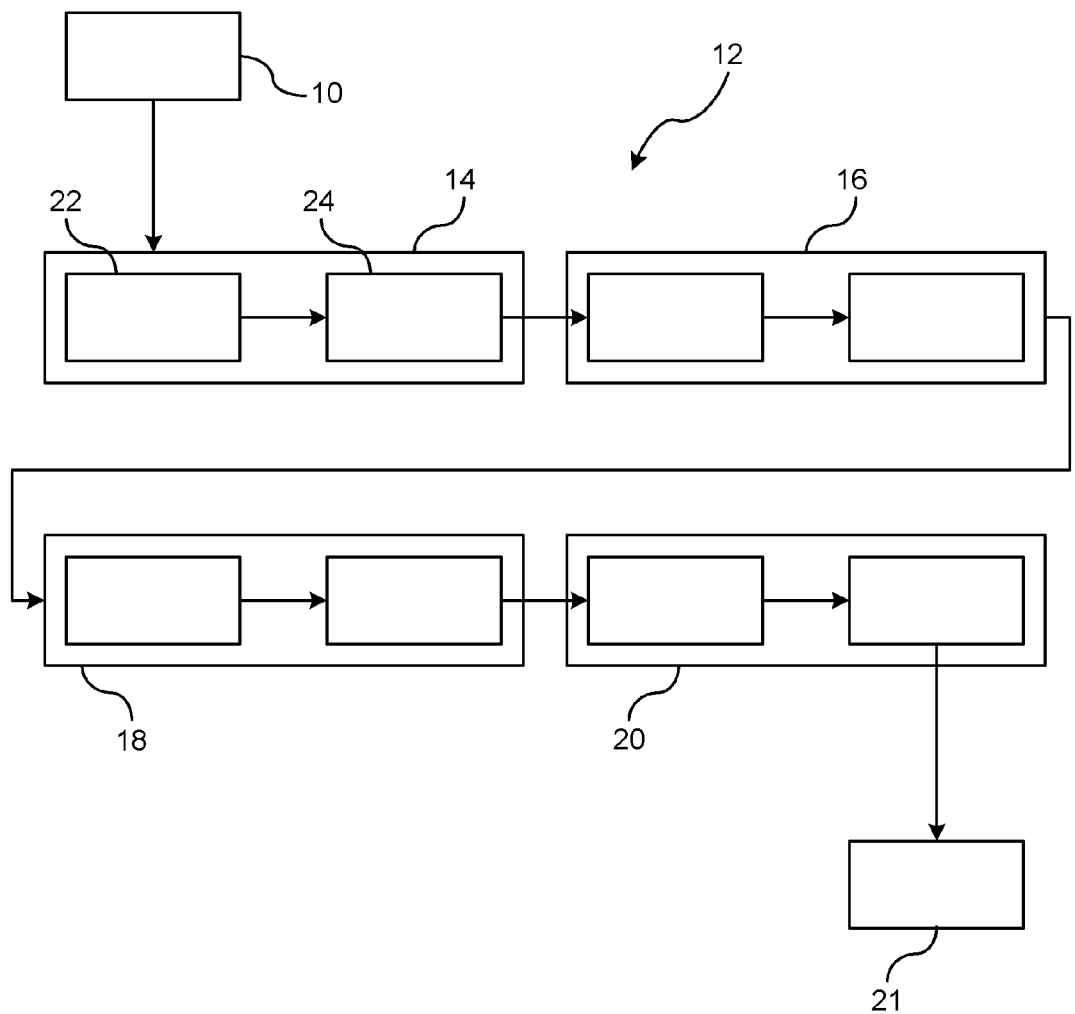
FIG. 1 is a block diagram of the object detection feature synthesis system.

There is shown in FIG. 1 a block diagram illustrating the concept of an object detection feature synthesis system. Object detection feature synthesis as described herein is regarded as an iterative interplay of two modules that include a feature generation module and a feature selection module. The feature generation module generates a temporary classifier and a feature family, and iteratively generates an extended feature family. New features are added to a previous temporary classifier. The feature selection module then prunes the new suggested features and learns a more defined classifier.

In FIG. 1, a plurality of still images of training data 10 is input into a training module 12. The training module 12 uses a plurality of iteration steps 14-20 for generating a trained object classifier 21. It should be understood that the number of iterations as shown herein is exemplary, and that any number of iterations can be used. For each iteration, a feature generation stage 22 and a feature selection stage 24 are executed.

The feature generation stage 22 generates a set of candidate features $F_n$. In the feature generation stage 22, a new set of features $T_n$, are added to the previous set of candidate features $F_{n-1}$.

In the feature selection stage, a selection technique, a selection technique selects a subset of candidate features $S \subset F_n$ of a fixed size M and returns a learned classifier $C_n$. An example of one such feature selection technique, that is known by those skilled in the art, is described in U.S. published application 2009/0287621 filed on May 15, 2008 entitled Forward Feature Selection For Support Vector Machines is incorporated by reference. It should be understood that the referenced feature selection technique is only one example of a selection technique and that other selection techniques known by those skilled in the art may be used herein.

There are two methods of constructing a candidate set. The first is a monotonic method and the second is a non-monotonic method. The monotonic method may be represented by the following formula:

$$F_n = F_{n-1} \cup T_n$$

where, $F_{n-1}$ is a previous set of candidate features, and $T_n$ is a new set of features, and $F_n$ is the set of candidate features formed from the union of the previous set of candidate features and the new set of features. The monotonic method uses all candidate features from the previously set.

The non-monotonic method may be represented by the following formula:

$$F_n = S_{n-1} \cup T_n$$

where, $S_{n-1}$ is the selected set of candidate features in iteration n−1, and $T_n$ is a new set of features, and $F_n$ is the set of candidate features formed from the union of the selected set of candidate features and the new set of features. The non-monotonic method uses selected features from the previous set.

After the feature selection is performed for the initial iteration 14, a next iteration 16 is executed. Each iteration will include a stage for generating new features and the feature selection method in each iteration is initialized with the previous selected features and their weights $(S_{n-1}, C_{n-1})$ directing its search for new useful features. After a number of iterations (n), the final classifier consists of the selected features $S_n$ and a learned classifier $C_n$ at the final iteration. The learned classifier $C_n$ is applied in a test environment such as a vehicle, factory, or other venue where object detection is applied. For example, the learned classifier may be implemented in a vehicle and applied to a captured image from a capture image device of the vehicle for identifying a person or other class of objects from the captured image.

Referring again to the training phase, and more specifically to the first feature generation iteration 14, a large pool of rectangular image fragments R is sampled from the training examples. The fragments are potential parts of an object. The fragments cover a wide range of possible object parts (e.g., arms, shoulders, elbows, etc.) with different sizes and aspect ratios. FIGS. 2a-2c illustrate an exemplary image and the various grid locations that are compared to the fragment using a desired descriptor technique for learning fragments of a class object. For a given image I and a respective fragment r, the image is localized and a sparse set of its detected locations $L^r$ are computed where each location $l \in L^r$ is an (x, y) image position within the given image I. An appearance descriptor (e.g., 128-dimensional SIFT descriptor) of the fragment is computed and compared to a computed appearance descriptor in the image in a dense grid using an inner product similarity that may be represented by the following formula:

$$a^r(l) = S(r) \cdot S(l),$$

where S(l) is the SIFT descriptor at location l with the same size as r. It should be understood that any other appearance descriptor may be used by the proposed method described herein and that SIFT is only one of the many possible options as alternatives may be used (e.g., HoG, NCC, etc) From the dense similarity mapping of all the image locations, a sparse detection set $L^r$ is computed as the five top scoring local maxima.

In each feature generation stage, features of a new type are generated where each feature is a scalar function over an image window: $f: I \mapsto R$. The feature generation function obtains the type of feature to generate in addition to the previous generated/selected features ($F_n$, $S_n$ correspondingly) and the fragment pool R, and creates new features of a desired type. For most of the feature types, new features are generated by transforming features from other types that are already present in $F_n$ or $S_n$.

Most of the features that are generated represent different aspects of the object-part detection, computed using the detection map $L^r$ of one or more fragments. The following represent the various feature types that may be generated. It should be understood that the feature types described below of only an example of a few of the feature types that may be generated and that other feature types may be used without deviating from the scope of the invention.

GlobalMax Features is a maximum appearance score over all image detections $f(I) = \max_{l \in L^r} a^r(l)$ given a fragment r and an image I. One max feature is generated per $r \in R$.

Sigmoid Features extend each GlobalMax feature by applying a sigmoid function to the appearance score to enhance discriminative power and is represented by the following formula:

$$f(I) = \max_{l \in L^r} G(a^r(l)) \text{ where } G(x) = 1/(1 + \exp(-20 \cdot (x - \theta))).$$

The Sigmoid function parameter $\theta$ was selected as a GlobalMax feature quantization threshold maximizing its mutual information with class labels.

Localized Features extend each sigmoid feature g by adding a localization score and are represented by the following formula:

$$f(I) = \max_{l \in L^r} G(a^r(l)) \cdot N(l; \mu, \sigma I_{2 \times 2})$$

where N is a two dimensional Gaussian function of the detection location l. Such features represent location sensitive part detections that attain a high value when both the appearance score is high and the position is close to the Gaussian mean, similar to parts in a star-like model. FIG. 3 illustrates localization of the feature. The rectangle denotes the fragment and the circle marks a $1^{st}$ standard deviation of its location Gaussian.

Subpart features are a spatial sub-part that is characterized by a subset B of the spatial bins in the descriptor, which are typically segregated into quarter sections with 2×2 spatial bins each. Given a localized feature g, the subpart feature is computed as the following:

$$f(I) = g(I) \cdot S^r(r)|_B \cdot S(l_{max})|_B$$

where $l_{max} \in L^r$ is the argmax location of the maximum operation in $g \in S_n$. FIG. 4 illustrates subpart features as described. The fragment designated by the large rectangle and the subpart is designated by the smaller rectangle within.

LDA features utilize descriptors $S(l_{max})$ computed for all training images, given a localized feature g, to train a LDA part classifier. The result is a 128 dimensional weight vector w, replacing the original fragment used in the original localized feature. The LDA feature is computed as follows:

$$f(I) = \max_{l \in L^r} G(w \cdot (l)) \cdot N(l; \mu, \sigma I_{2 \times 2}).$$

The logical "OR" feature provides that given two localized features $g \in S_n$ and $g' \in F_n$, an "OR" feature is computed as $f = \max(g, g')$ if their associated fragments originated in similar locations. Such "OR" logical features aim to represent semantic object parts with multiple potential appearances. "OR" features with more than two fragments can be created using a recursive "OR" application in which g is already an "OR" feature. FIG. 5 illustrates the logical "OR" where the associated fragments from different images are generated as potential features.

In Cue-integration a co-occurrence descriptor CO(l) is computed (i.e., given a localized feature g) in all training images and an LDA part classifier is trained using them. The co-occurrence descriptor expresses texture, color, or shape information in addition to the SIFT. The feature is computed as an LDA feature but with the CO(l) replacing the S(l). Similarly, features are generated that integrate both channels by concatenating the SIFT and the co-occurrence descriptors.

The logical "AND" features provide that given two features based on fragments r, r', co-detection scores are computed using the formula:

$$f = \max_{l \in L^r, l' \in L^{r'}} a^r(l) \cdot a^{r'}(l') N_{rel}(l - l') \cdot N_{abs}((l + l')/2), \text{ where}$$

$N_{rel}$, $N_{abs}$ are Gaussian functions preferring a certain spatial relation between the fragments and a certain absolute location, respectively. Several hundred such features are generated by selecting pairs in which the score correlation in the training example is higher than the correlation in negative images. FIG. 6 illustrates a logical "AND" function that utilizes two localized fragments that have a spatial relationship. The combination of both localized fragments generates a feature.

Figure 7:
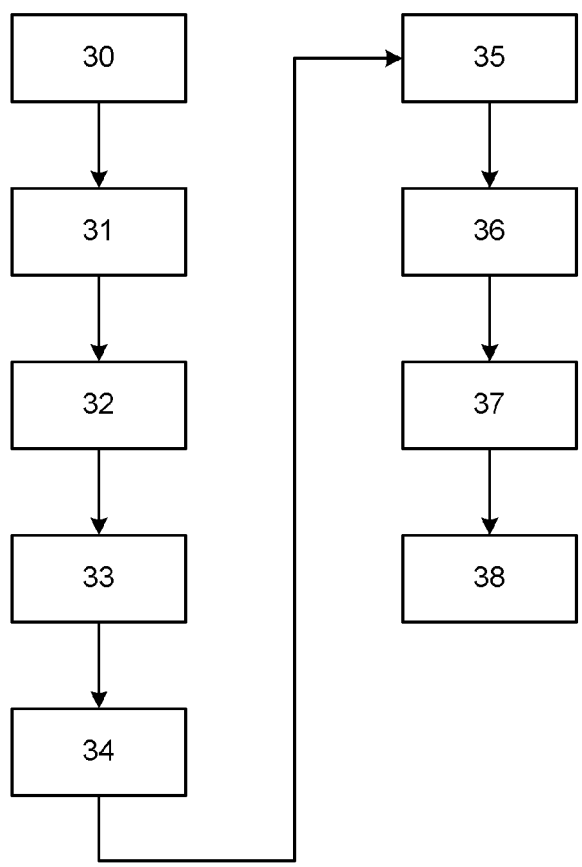
FIG. 7 is a flowchart of a method for feature generation for a first iteration.

FIG. 7 illustrates a flowchart of a method for feature generation for the first iteration only. In step 30, samples images are obtained from training images. Training images include positive images having identifiable features for learning.

In step 31, random fragments are extracted from the positive examples.

In step 32, an appearance descriptor is computed for each fragment extracted.

In step 33, a plurality of still images is obtained for comparison with the extracted fragment.

In step 34, an appearance descriptor is computed for each image location.

In step 35, each fragment is compared to each image location by comparing a similarity between their respective appearance descriptors.

In step 36, the appearance descriptors having the local maxima are identified and stored. This can be performed by storing the location of the peak and the score of the associated peak.

In step 37, an appearance feature is generated as a function of the maximum score.

In step 38, the feature selection process is applied for selecting which features are to be added for additional feature synthesis.

After the first iteration is complete, all selected features are initialized for feature generation processing for a next iteration. A new family of features is generated by transforming new features from the selected features that include additional information. Alternatively two or more features may be combined into one or more complex features that include at least one of the selected features. As described earlier, the feature and process for generating the features may include HoG features, GlobalMax features, Sigmoid features, localized features, subpart features, LDA features, "OR" features, "AND" features, and cue-integration features.

Figure 8:
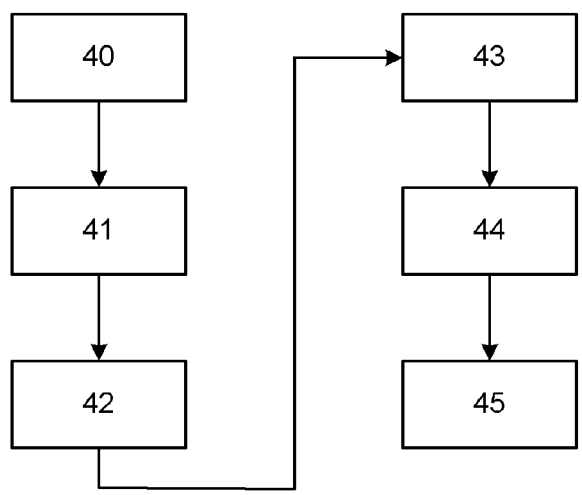
FIG. 8 is a flowchart of a method for detecting an object in real-time using a learned classifier.

FIG. 8 illustrates a method for detecting an object in test-time using the learned classifier. In step 40, a still image is obtained from an image capture device on the vehicle. The image capture device may include a camera, a video camera, or any other imaging device in which a still image may be extracted.

In step 41, the appearance descriptor is determined for each image location of the captured image.

In step 42, the appearance descriptors of all the fragments in the classifier are compared with the appearance descriptors determined for each image location in the captured image.

In step 43, for each fragment, a determination is made whether the fragment is detected in the still image by using the local maximum score of the appearance descriptor similarity function.

In step 44, the feature is identified by a score that relates to a feature in the learned classifier. The classifier uses the score to identify the feature for which it relates.

In step 45, a probability is computed of the image containing a class object utilizing the combination of features identified by the classifier.

It should be understood that after each type of feature is added, the feature selection stage is re-executed for selecting a subset of features.

While certain embodiments of the present invention have been described in detail, those familiar with the art to which this invention relates will recognize various alternative designs and embodiments for practicing the invention as defined by the following claims.

What is claimed is:

1. A method for training and using an object classifier to identify a class object from a captured image, the method comprising the steps of:
    (a) obtaining a plurality of still images from training data;
    (b) applying a feature generation technique to the plurality of still images of the training data for identifying candidate features from each respective image,
        wherein applying the feature generation technique further comprises the steps of:
        identifying a comparative image of a known object;
        randomly extracting a fragment from the comparative image;
        comparing the extracted fragment to each of the plurality of still images, wherein each still image is partitioned into a plurality of image sections that are identified by an image position, wherein the fragment and each image position are compared using a feature descriptor technique;
        determining a similarity score between the fragment and each image position in each image;
        identifying the respective image position having a highest similarity score in each respective image;
        compiling a group of fragments that have the highest similarity score from each respective image;
    (c) selecting a subset of features from the candidate features using a similarity comparison technique;
    (d) iteratively repeating steps (a) through (c) a predetermined number of times as a function of the selected subset of features identified in step (c);
    (e) generating a trained object classifier;
    (f) capturing an image from an image capture device;
    (g) classifying features in the captured image using the trained object classifier; and
    (h) determining whether the captured image contains a class object based on the trained object classifier associating an identified feature in the image with the class object.

2. The method of claim 1 wherein determining the similarity score comprises the steps of:
    computing an appearance descriptor for the extracted fragment;
    computing an appearance descriptor for each image position in each image;
    comparing the appearance descriptor of the extracted fragment to the appearance descriptor of a respective image position;
    determining a similarity score in response to the comparison between the appearance descriptors of the extracted fragment and the respective image position.

3. The method of claim 2 wherein a sigmoid function is applied to the similarity score to further distinguish a similarity between the extracted feature and the image positions.

4. The method of claim 2 wherein a location score is applied to the similarity score, the location score identifying a preferred location in the image where the extracted feature should be located, wherein the location score enhances the similarity score by distinguishing the similarity between the extracted feature and the image positions.

5. The method of claim 4 wherein a subpart technique is applied to the preferred location, wherein the preferred image of the location is portioned into quadrants, wherein the feature descriptor technique is applied to each quadrant.

6. The method of claim 4 wherein a linear discriminant analysis technique is applied to each image position.

7. The method of claim 4 wherein a cue integration is applied to each image position, wherein the cue integration provides a texture requirement to the feature.

8. The method of claim 4 wherein a logical "or" function is applied to two image locations, wherein the feature may be represented in the image at two preferred locations.

9. The method of claim 4 wherein a logical "and" function is applied to two image locations, wherein a spatial relationship is demanded by images at two preferred locations.

10. The method of claim 2 wherein a combination of the similarity score and the location of the image position are stored in a memory.

11. The method of claim 1 wherein a score is generated that identifies the similarity between the appearance descriptors of each extracted fragment of the comparative image and each image location in each still image.

12. The method of claim 1 wherein the selected subset of features is used to generate a next group of features utilized in a next iteration.

13. The method of claim 12 wherein the selected subset of features is used to transform a feature of the selected subset to include additional information relating to a respective feature.

14. The method of claim 12 wherein the selected subset of features is used in a combination of at least two fragments to generate a complex feature.

15. The method of claim 1 wherein step (d) further includes transforming new features from the selected feature using additional feature details.

16. The method of claim 1 wherein step (d) further includes combining two or more features into a complex feature that includes at least one of the selected features.

17. A method for training and using an object classifier to identify a class object from a captured image, the method comprising the steps of:
 (a) obtaining a plurality of still images from training data;
 (b) applying a feature generation technique to the plurality of still images of the training data for identifying candidate features from each respective image;
 (c) selecting a subset of features from the candidate features using a similarity comparison technique;
 (d) iteratively repeating steps (a) through (c) a predetermined number of times as a function of the selected subset of features identified in step (c);
 (e) generating a trained object classifier;
 (f) capturing an image from an image capture device;
 (g) classifying features in the captured image using the trained object classifier, wherein classifying the features in the capture image comprises the following steps:
  identifying image locations in the captured image;
  comparing each feature of the trained object classifier with each fragment in each image location of the captured image, wherein each fragment in each image location and each feature in the trained object identifier are compared using a feature descriptor technique;
  computing an appearance descriptor for each fragment in each image location;
  comparing the appearance descriptor of each fragment in each image location with the appearance descriptor of each feature of the trained object classifier;
  determining a similarity score between each compared to appearance descriptor of each fragment in each image location and each trained object classifier; and
 (h) determining whether the captured image contains a class object based on the trained object classifier associating an identified feature in the image with the class object.

18. The method of claim 17 wherein determining whether the image contains a class object includes computing a probability as a function of the similarity score.

19. The method of claim 17 wherein the probability is based on a combination of multiple features.

* * * * *